June 23, 1953
A. T. SCHEIWER
2,643,140
COUPLING
Filed April 29, 1948
2 Sheets-Sheet 2
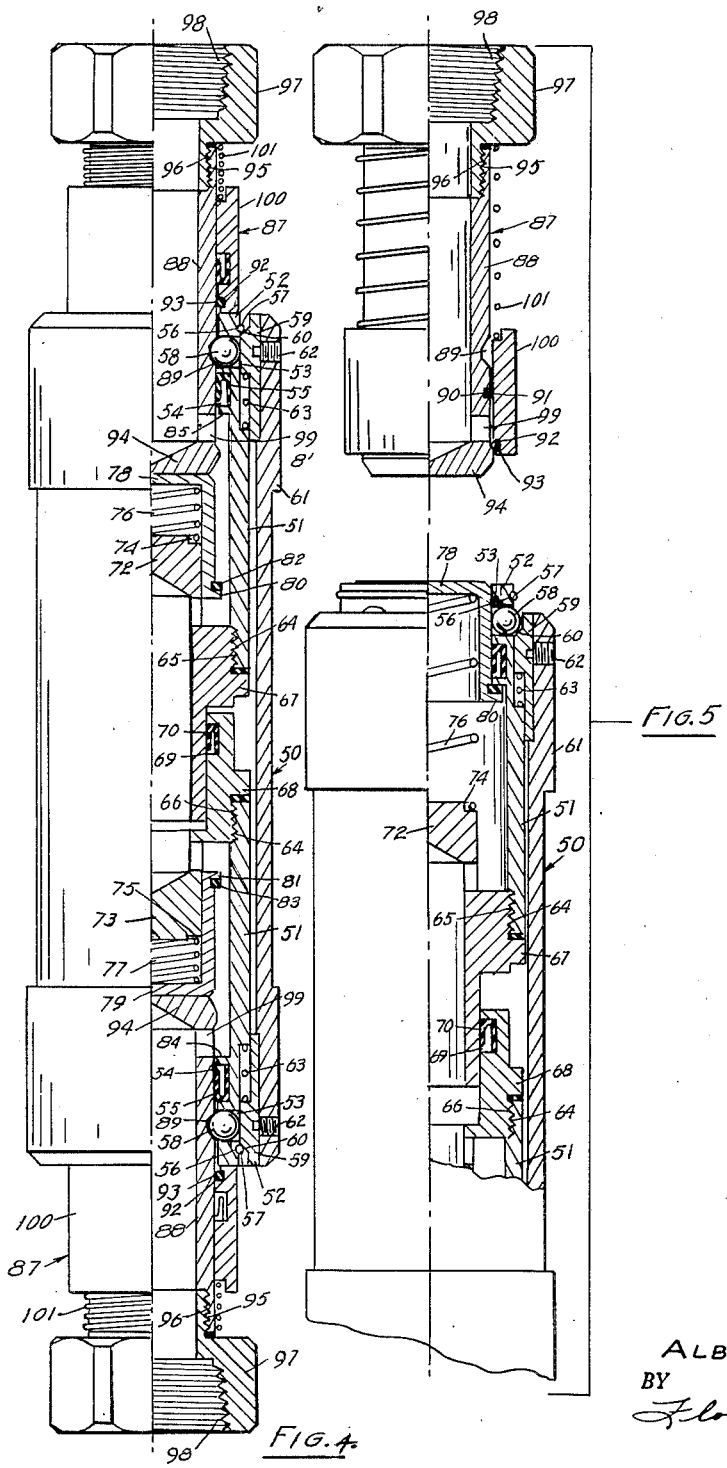
INVENTOR.
ALBERT T. SCHEIWER
BY
Florian G. Miller
Atty.

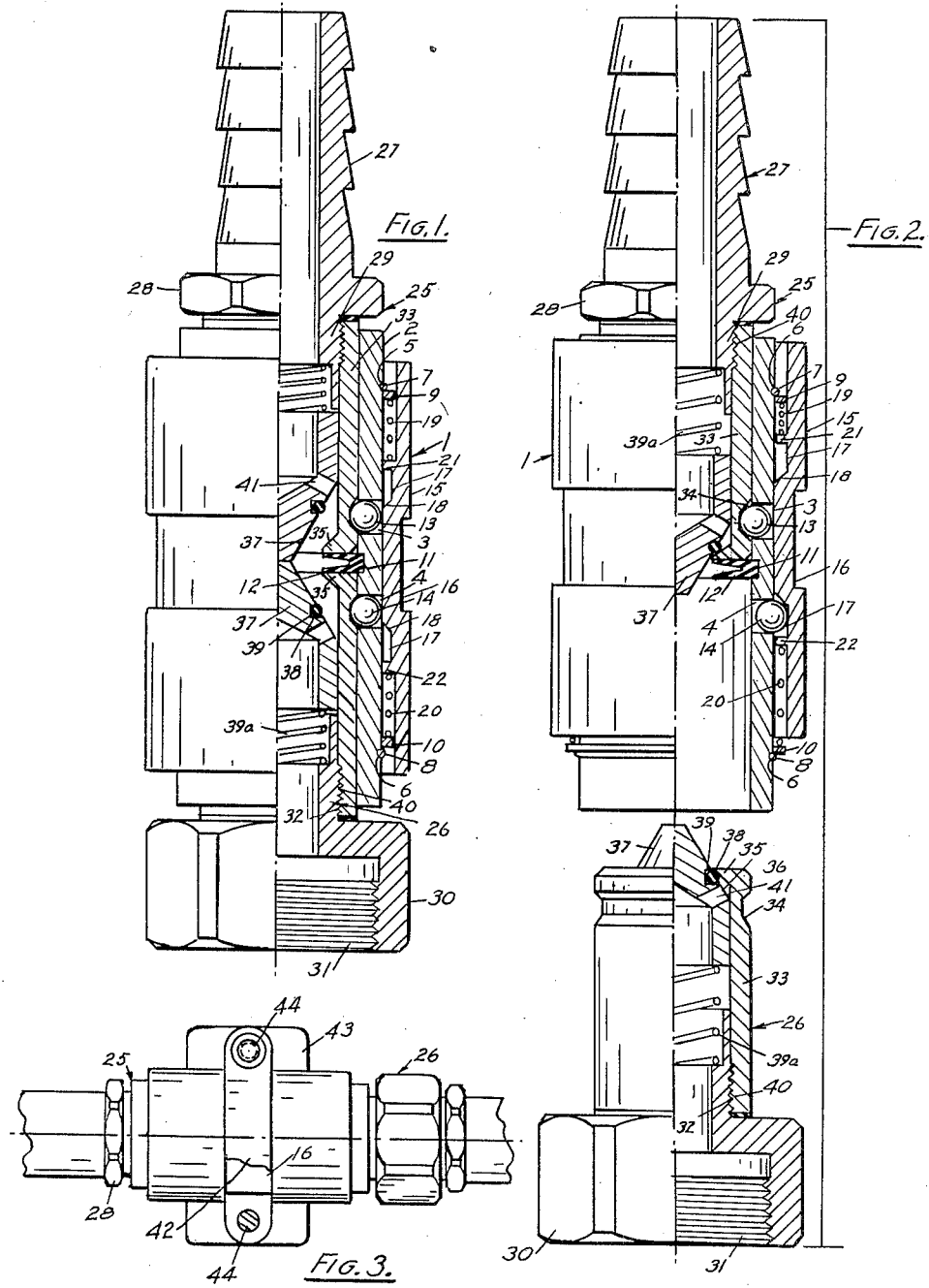
INVENTOR.
ALBERT T. SCHEIWER

Patented June 23, 1953

2,643,140

UNITED STATES PATENT OFFICE 2,643,140

COUPLING

Albert T. Scheiwer, Erie, Pa.

Application April 29, 1948, Serial No. 23,973

4 Claims. (Cl. 285—193)

This invention relates generally to couplings and more particularly to couplings which are connected together by a snap action.

Couplings made in accordance with the teachings of the prior art, and with which I am familiar, have provided no suitable means for closing the ends of the coupling members to keep out dust, dirt, and the like. This has been true whether check valves have been provided in the male and female members or whether they have not been provided. No suitable coupling has heretofore been provided wherein a female member has connected thereto on opposite ends thereof male coupling members with check valves which interact with one another upon connection to the female member to open them for the flow of fluid through the coupling. No suitable coupling has heretofore been provided which will disconnect upon an abnormal pull on the hose and close off the flow of fluid from the hose connecting the coupling.

It is, accordingly, an object of my invention to overcome the above and other defects in couplings and it is more particularly an object of my invention to provide a coupling which is simple in construction, economical in cost, economical in manufacture and efficient in operation.

Another object of my invention is to provide a coupling of the snap action type wherein two male members are connected to opposite ends of a female member.

Another object of my invention is to provide a coupling wherein the ends of the male and female members are closed when disengaged so that no dirt, dust, or the like enters the coupling member.

Another object of my invention is to provide a female coupling member for connecting two male coupling members thereto utilizing one sleeve for locking the two male coupling members to the female coupling members.

Another object of my invention is to provide a female coupling member for connecting two male members thereto wherein the check valves of the male members engage each other to open the coupling to the flow of fluid.

Another object of my invention is to provide a coupling having a female member for connecting two male members thereto with novel structural elements along with efficient sealing members and locking devices.

Another object of my invention is to provide a coupling particularly for use with high pressures wherein the male members may be connected to the female member with a minimum of effort and in a minimum of time.

Another object of my invention is to provide a coupling comprising a female member for connecting two male members with check valves therein so that when the check valves are opened, a maximum flow of fluid will pass through the coupling.

Another object of my invention is to provide a coupling with check valves which will automatically disengage upon an abnormal pull on the hose connected thereto.

Other objects of my invention will become evident from the following detailed description, taken in conjunction with the accompanying drawings, in which Fig. 1 is a side elevational view broken away at the center line of my novel coupling in a locked position;

Fig. 2 is an exploded view with one side thereof broken away on the center line, of my novel coupling with one side thereof in an open position before connection;

Fig. 3 is a top plan view of my novel coupling with the male members connected to the female member and a strap for securing same;

Fig. 4 is a modified form of my invention with one side thereof broken away on the center line, of a modified form of my invention in locked position; and Fig. 5 is an exploded view with parts broken away on the center line thereof of the coupling shown in Fig. 4.

Referring now to the drawings, Figs. 1, 2 and 3 show a female member 1 comprising a cylindrical member 2 having ball retaining apertures 3 and 4 and annular grooves 5 and 6 for receiving spring clips 7 and 8 which retain annular stop members 9 and 10. The cylindrical member 2 also has an arcuate shaped groove 11 for receiving a generally U-shaped sealing washer 12. The washer 12 may have a circular cross-section. Balls 13 and 14 are retained in the ball retaining apertures 3 and 4. A cylindrically shaped locking sleeve 15 is telescopically disposed on the cylindrical member 2 for lockingly engaging the ball members 13 and 14. The locking sleeve 15 has an outer annular groove 16 formed thereon and two similar inner annular grooves 17 each with one tapered side 18 are provided for receiving the ball members 13 and 14 wherein they may be moved outwardly a predetermined distance from the apertures 3 and 4. Coil springs 19 and 20 are disposed between shoulders 21 and 22 and stop members 9 and 10 to urge the locking sleeve 15 to a central position as shown in Fig. 1.

The male members 25 and 26 are alike except that I show the male member 25 with a serrated connecting portion 27, a wrench engaging portion 28 and an extending threaded portion 29. The male member 26 is shown with a cup-shaped wrench engaging member 30 having an internally threaded portion 31 and a reduced threaded portion 32, the internally threaded portion 31 adapted to be engaged to an external threaded portion of any suitable coupling member. Each of the male members 25 and 26 comprises a cylindrically shaped member 33 having an annular grooved portion 34 and an inwardly directed flanged portion 35 with the inner side thereof tapered at 36 forming a seat to sealingly engage a conical shaped check valve 37. The check valve 37 may have bonded rubber or other suitable flexible material formed on the outer surface thereof or a ring washer as shown at 38 may be disposed in a groove 39 to sealingly engage the inner tapered portion 36 of the flange 35 when a male member 25 or 26 is disconnected as shown in Fig. 2. A spring 39a urges the check valve 37 into sealing relationship with the seat 36. The cylindrical members 33 have internal threads 40 formed thereon for threadably engaging the threaded portions 29 and 32 of the members 27 and 30. The springs 39a seat on the ends of the threaded portions 29 and 32 of the members 27 and 30. A strap 42 may be secured to a support 43 by bolt and nut assemblies 44 as shown in Fig. 3 with the strap 42 disposed in the annular groove 16 in the locking sleeve 15. It will thus be seen that any abnormal pull on either of the male members 25 or 26 will cause relative movement between the locking sleeve 15 and the cylindrical member 2 thereby freeing either ball members 13 or 14 from the groove 34 in one of the male members 25 or 26 whereby disengagement results.

The check valves 37 have laterally extending apertures 41 for the flow of fluid through the coupling when the male coupling members 25 and 26 are connected to the female coupling member 1 as shown in Fig. 1.

In operation, the locking sleeve 15 is moved in a direction opposite to the male member 25 or 26 being inserted in the female member 1 as shown in Fig. 2. In this position, the groove 18 in the locking sleeve 15 is in alignment with the ball retaining apertures 4 thereby permitting the ball members 14 to move outwardly into the groove 17. The male member 25 or 26 is then inserted into the female member 1 and the locking sleeve 15 is moved in a reverse direction wherein the balls 14 are forced into locking engagement with the peripheral groove 34 on the member 33 to lock the male member into sealing engagement with the washer 12 in the female member 1. The same operation is performed to connect the opposing male member. When both of the male members 25 and 26 are connected with the female member 1 as shown in Fig. 1, the locking sleeve 15 is in a locking position with respect to ball members 13 and 14. When the second male member 25 or 26 is disposed in the female member 1, the nose portions of the check valves 37 are engaged as shown in Fig. 1 and forced to an open position so that fluid may flow through the laterally extending apertures 41 in the check valves 37. The disconnection of the male members 25 and 26 from the female member 1 will be evident from the above description of the operation of the connection of the male members 25 and 26 to the female member 1 and from an inspection of the drawing. When one of the male members 25 or 26 is disconnected from the female member 1, the check valves 37 will be forced to a position shown in Fig. 2 in sealing relation with the tapered seat 36 of the inwardly directed flanged portion 35 of the cylindrical members 33. It will be evident from the foregoing description that the ends of the male members 25 and 26 are always closed when disconnected and only one locking sleeve is required for engaging and disengaging the male members 25 and 26 to and from the female member 1.

Referring now to Figs. 4 and 5, I show a modified form of my invention with a female member 50 comprising opposed identical cylindrical shells 51 each having an offset inwardly directed portion 52. Each of the portions 52 have ball retaining apertures 53, washer grooves 54 for receiving a washer 55 and external annular grooves 56 for receiving stop clips 57. The ball retaining apertures 53 retain ball members 58. Locking sleeves 59 having camming portions 60 are connected to opposite ends of outer cylindrical member 61 by locking screws 62. Spring members 63 urge the locking sleeves 59 against the stop clips 57. Each of the complementary cylindrical shells 51 have an internally threaded portion 64 for threadably engaging the threaded portions 65 and 66 of telescoping connecting members 67 and 68. Telescoping member 68 has an internal groove 69 for receiving a washer 70 to sealingly engage the members 67 and 68. The members 67 and 68 have outwardly extending cylindrical portions 72 and 73 with annular L-shaped grooves 74 and 75 formed on the ends thereof for nesting springs 76 and 77 which urge cup-shaped closing members 78 and 79 to a position as shown in Fig. 5 with the end faces of the cup-shaped members 78 and 79 flush with the end of the members 51. Each of the cup-shaped members 78 and 79 has an outwardly directed flange 80 and 81 with washers 82 and 83 disposed adjacent thereto for sealingly engaging shoulders 84 and 85 formed on the members 51 when the cup-shaped members 78 and 79 are in a closed position to seal the female member 50 against entrance of dust, dirt, and the like.

The male members 87 are alike and engage opposite ends of the female member 50. Each of the male members 87 comprises a cylindrical member 88 having a peripheral groove 89, a washer groove 90 for receiving a washer 91, a groove 92 for receiving a ring washer 93, a tapered headed portion 94 and an internally threaded portion 95 for receiving the extended threaded portion 96 of a wrench engaging member 97 which is threaded internally at 98 to receive any suitable threaded coupling. It will be evident that any form of connecting member may be threadably engaged with the threaded portion 95 of the cylindrical member 88. The cylindrical member 88 has laterally extending apertures 99 for the flow of fluid through the coupling. A sleeve 100 is telescopically disposed on the cylindrical member 88 and is urged against the washer 93 by a coil spring 101.

In the operation of my coupling shown in Figs. 4 and 5 the members 51 are normally in a position as shown in Fig. 5 when in a disengaged position. In this position, the ball members 58 are held outwardly in the path of the camming portions 60 of the sleeves 59 so that the end of the members 51 extend outwardly from the ends of the cylindrical member 61. A male member 87 is then forced against the cup-shaped member 78 and it is pushed rearwardly to a position shown in Fig. 4. The ball members 58 will be forced into locking engagement with the groove 89 on the male member 87 by the spring-urged camming portion 60 of the sleeve 59. The laterally extending apertures 85 are then free inasmuch as the sleeve 100 on the male member 87 is pushed out of sealing relationship therewith by engagement with the end of the female member 50.

In the disconnection of the coupling shown in Figs. 4 and 5, it will be evident that upon an abnormal pull on either of the male members 87, the cylindrical member 51 engaged therewith will move outwardly to a position where the ball members 58 may move outwardly out of locking engagement with the groove 89 on the male member 87, wherein the male member 87 may be removed. The cup-shaped member 78 or 79 will follow the male member 87 and move to a closed position as shown in Fig. 5 with the ball members 58 held outwardly in the path of the sleeve 59 ready for another insertion of the male member 87.

It will be evident from the foregoing description that I have provided a novel fluid coupling which is easy to connect and disconnect under high pressures, which provides a single sleeve for connecting two male members to a female member, which has novel check valves, which may be disconnected upon an abnormal pull on a male member, and which when disconnected is closed to the entrance of dust, dirt and the like.

Various changes may be made in the specific embodiment of my invention without departing from the spirit thereof or from the scope of the appended claims.

What I claim is:

1. A coupling comprising a female member having an integral cylindrical shell, longitudinally spaced cam members carried by said shell, male members having peripheral grooves formed therein, said male members disposed in opposite ends of said shell, a sleeve telescopically and slidably disposed on said shell, locking means on said sleeve, said locking means having opposed camming portions engaging said spaced cam members carried by said shell of said female member, said cam members engaging said peripheral grooves, said camming portions being integral with said sleeve.

2. A coupling comprising a female member having an integral cylindrical shell, longitudinally spaced cam members carried by said shell, male members having peripheral grooves formed therein, said male members disposed in opposite ends of said shell, a locking sleeve telescopically and slidably disposed on said shell, locking means on said sleeve, said locking means having opposed camming portions engaging said spaced cam members carried by said shell of said female member, said cam members engaging said peripheral grooves, said camming portions being integral with said sleeve, and springs provided on opposite ends of said locking sleeve, one end of each spring engaging said sleeve and one end of each spring engaging said cylindrical shell thereby urging said locking means to a neutral position covering the cam members carried by the shell in said female member.

3. A coupling comprising a female member having an integral cylindrical shell, longitudinally spaced cam members carried by said shell, male members having peripheral grooves formed therein, said male members disposed in opposite ends of said shell, a sleeve telescopically and slidably disposed on said shell, locking means on said sleeve, said locking means having opposed camming portions engaging said spaced cam members carried by said shell of said female member, said camming portions being integral with said sleeve, said cam members comprising balls disposed in apertures in said shell member and engaging said grooves.

4. A coupling comprising a female member having an integral cylindrical shell, longitudinally spaced cam members carried by said shell, male members having peripheral grooves formed therein, said male members disposed in opposite ends of said shell, a locking sleeve telescopically and slidably disposed on said shell, locking means on said sleeve, said locking means having opposed camming portions engaging said spaced cam members carried by said shell of said female member, said camming portions being integral with said sleeve, and springs provided on opposite ends of said locking sleeve, one end of each spring engaging said sleeve and one end of each spring engaging said cylindrical shell thereby urging said locking means to a neutral position covering the cam members carried by the shell in said female member, said cam members comprising balls disposed in apertures in said shell member and engaged in said grooves.

ALBERT T. SCHEIWER.

References Cited in the file of this patent

UNITED STATES PATENTS

| Number | Name | Date |
| --- | --- | --- |
| 130,095 | Wightman | July 30, 1872 |
| 2,182,797 | Dillon | Dec. 12, 1939 |
| 2,184,376 | Beyer et al. | Dec. 26, 1939 |
| 2,322,449 | Johnson et al. | June 22, 1943 |
| 2,479,960 | Osborn | Aug. 23, 1949 |
| 2,512,999 | Bruning | June 27, 1950 |

FOREIGN PATENTS

| Number | Country | Date |
| --- | --- | --- |
| 95,861 | Germany | Jan. 28, 1898 |
| 388,080 | Great Britain | Feb. 23, 1933 |